United States Patent [19]

Sakai et al.

[11] 4,264,920
[45] Apr. 28, 1981

[54] INTEGRATED PICKUP COMPONENT AND ADJUSTING ARRANGEMENT THEREFOR

[75] Inventors: Hideyuki Sakai, Mobara; Shinji Otsuka, Chiba, both of Japan

[73] Assignee: Hitachi, Ltd., Tokyo, Japan

[21] Appl. No.: 44,341

[22] Filed: May 30, 1979

[30] Foreign Application Priority Data

Jun. 2, 1978 [JP] Japan ................................ 53-65829

[51] Int. Cl.³ .............................................. H04N 9/09
[52] U.S. Cl. ...................................... 358/50; 358/51; 358/55
[58] Field of Search .......................... 358/43, 50–52, 358/55, 229, 10

[56] References Cited

U.S. PATENT DOCUMENTS 4,185,297  1/1980  Yamauchi et al. ..................... 358/55

FOREIGN PATENT DOCUMENTS 2744592  4/1978  Fed. Rep. of Germany ............. 358/55

*Primary Examiner*—John C. Martin
*Attorney, Agent, or Firm*—Charles E. Pfund

[57] ABSTRACT

An integrated pickup component used to support and mount thereto image pickup tubes is mounted to a color separation optical system of a multi-tube type color television camera. The integrated pickup component comprises a plurality of primary assembly retaining cylinders each housing an image pickup tube and its peripheral parts which are to be fixed to the cylinder with an adhesive in a ready-to-use manner, and a mount holder integrally formed in itself for attaching thereto the primary assembly retaining cylinders of respective image pickup tubes. Before connecting and fixing this integrated pickup component to the color separation optical system of the color television camera, the component is attached to an adjusting arrangement having an optical system with identical functions to those of the color separation optical system for the camera. The relative positions between each of the primary assembly retaining cylinders and the mount holder are adjusted by monitoring with a picture monitor the correct registration of the color separated optical images with the electron beam scanning areas in respect of their focus points, the sizes, the rotational positions and the center positions through the use of the optical system of the adjusting arrangement. Relative positions thus adjusted are then fixed with an adhesive.

6 Claims, 5 Drawing Figures

INTEGRATED PICKUP COMPONENT AND ADJUSTING ARRANGEMENT THEREFOR

BACKGROUND OF THE INVENTION

The present invention concerns a device to support and mount image pickup tubes, or an integrated pickup component, and more particularly it concerns an integrated pickup component for multi-tube type color television camera and its adjusting arrangement.

There is available in the art a single tube type color television camera wherein a single image pickup tube with a color separation stripe filter is used for obtaining therefrom signals for three primary colors of the object, but it is subjected to many restrictions regarding the number of stripes of the filter and the separation of color signals, and is substantially inferior in respect of its picture quality than the multi-tube color television cameras to which reference will be made later.

The multi-tube type color television cameras, particularly tri-tube type cameras which separate the incident lights from the object by the color separation optical system into three primary colors of red (R), green (G) and blue (B), and which conduct photoelectric conversion by the respective image pickup tubes for respective colors are particularly excellent in resolution and sensitivity and reproduce excellent pictures with minimized color mixture. However, the multi-tube color television camera cannot obtain correct registration of pictures of different colors on its picture screen when the areas of separated optical images of the object which are scanned with electron beams do not coincide with each other on the target of the image pickup tube, and the picture quality becomes inferior with color blurs.

One conceivable cause for such a registration failure is the imperfect focus tracking wherein separated optical images of R, G and B do not correctly focus on the target planes of R, B and G pickup tubes. Further, even when the focus tracking is perfect and optical images of R, G, and B are correctly focused on the target plane of respective tubes, the registration mentioned above still is not obtainable if there are errors in respect of the center, the rotational position and the dimension between optical images and the electron beam scanning areas on the target planes of the corresponding image pickup tubes.

In one example of an image pickup tube device for conventional multi-tube color television camera, each image pickup tube assembly including an image pickup tube, a deflecting coil assembly arranged around the image pickup tube, a holder for holding therein the image pipckup tube and the deflecting coil assembly is securely and precisely attached to the housing of the color separation optical system of the camera, and thereafter focus tracking and adjustment for coincidence of the center position, the rotational position and dimension are effected in respect of each image pickup tube assembly.

In other words, the focus tracking worm gear attached to the holder is used to move the image pickup tube assembly in axial directions so as to make correct coincidence of the position of the target plane of the image pickup tube with the position of the object image focused by lens and color separation optical system. In order to eliminate errors in the rotational position caused by the object image inclining by a certain degree in respect of the scanning area as the corresponding sides of the rectangular electron beam scanning area and the rectangular object image are not parallel to each other, although the center positions of these rectangles are correctly registered, a rotation worm gear attached to the holder is used and the image pickup tube assembly is rotated around the tube axis. After focus tracking and rotational position are adjusted, the deflecting coil assembly is fixed tightly to the holder with an adhesive and the focus tracking worm gear and the rotation worm gear are locked. The error in center position between the electron beam scanning area and the object image, and the dimensional error which is a difference in size are usually corrected electrically by, for instance, adjusting deflection current and bias current passed through the defecting coil. Refer to NHK Technical Monograph, No. 25, March 1976, page 21, FIG. 3.6 for such a conventional device.

In the tri-tube color television camera of the prior art, components had to be assembled first, and the complicated adjustment had to be made. However, the size and weight of the camera are generally limited because smaller cameras are usually easier to handle. This leads to difficulties in adjustment arising out of the various restrictions imposed on the arrangement of the adjusting mechanism, and of the restrictions on designing camera mechanism in such small sized cameras. It was, therefore, very difficult in the prior art to manufacture inexpensive, compact, multi-tube type color television cameras. It is axiomatic that the construction becomes automatically complex if the lock mechanism has to be secured for maintaining the completed adjustment, and that the holding mechanism for this construction is requirred to be precisely frabricated from sturdy materials in order to maintain the stability of the lock mechanism.

In spite of the fact that these mechanisms become entirely unnecessary once the adjustment is completed and maintained, the conventional tri-tube type color television cameras require a highly precise and complex mechanism to make adjustment for keeping the image pickup tubes at optimum positions and angles, and a sturdy retaining mehanism to retain the adjusted precision and the superior picture quality stably. This necessarily increased the size, the weight and the cost of these cameras as well as the time required for making adjustment for the complex mehanism, thereby restricting the use of the tri-tube type color television cameras to commercial uses such as that by broadcasting stations, etc.

SUMMARY OF THE INVENTION

An object of the present invention is to provide an integrated pickup component or a device to support and mount the image pickup tubes and an adjusting arrangement therefor which can facilitate a comparatively inexpensive manufacture of compact, light-weight multi-tube color television cameras with high quality picture images and without a need for adjustment of registrations by the user.

In order to achieve the above object, the integrated pickup component of the present invention comprises a plurality of primary assembly retaining cylinders each housing an image pickup tube and its peripheral parts which are to be fixed to the cylinder with an adhesive in a ready-to-use manner, and a mount holder integrally formed in itself for attaching thereto the primary assembly retaining cylinders of respective image pickup tubes. Before connecting and fixing this integrated pickup component to the color separation optical system of the color television camera, the component is attached to the adjusting arrangement having an optical system with identical functions to those of the color separation optical system for the camera, means to finely adjust the relative positions between the primary assembly retaining cylinders and the mount holder, and means to monitor signals from the image pickup tube which are displayed on a picture screen, the adjusting arrangement being such that it opens to the outside to make it possible to freely have access to the integrated pickup component being adjusted, whereby the relative positions between each of the primary assembly retaining cylinders and the mount holder are adjusted by monitoring with the monitoring means the correct registration of the color separated optical images with the electron beam scanning areas in respect of their focus points, the sizes, the rotational positions and the center positions when the color separated optical images of an adjustment pattern is projected, through the optical system of the adjusting arrangement, on a position where the target plane of each of the image pickup tubes should be present. Relative positions thus adjusted are then fixed with an adhesive.

BRIEF DESCRIPTION OF THE DRAWINGS

FIG. 4 is a plan view showing the exploded portion of FIG. 3 viewed from above; and FIG. 5 is a block diagram showing the construction of monitoring means of the adjusting arrangement.

DESCRIPTION OF PREFERRED EMNBODIMENTS

Figure 1:
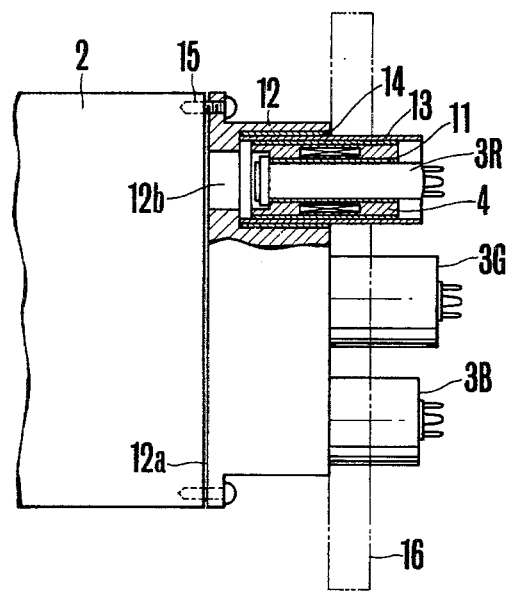
FIG. 1 is a plan view, partly in section, of a multi-tube type color television camera provided with an integrated pickup component embodying the present invention.

Referring to FIG. 1, an integrated pickup component of the present invention comprises an integral mount holder 12 and a plurality of primary assembly retaining cylinders 13. As is apparent from an illustration in section of a red image pickup tube 3R, peripheral parts such as yoke assembly 4 and the like are arranged in advance around the image pickup tube in a ready-to-use manner, housed in the primary assembly retaining cylinder 13, and fixed thereto in this state with an adhesive as shown by the reference numeral 11, thereby constituting an image pickup tube assembly. Such peripheral parts as a deflecting coil, a focus coil, etc. become necessary depending on the type of the image pickup tube used. An alignment coil or alignment magnet is also attached. If a preamplifier to amplify the electric signals of the picture images sent out from the terminal located on the outer periphery of the image pickup tube face plate is positioned close to the image pickup tube as the peripheral part, S/N ratio can be improved. It is necessary to conduct magnetic and electrostatic shieldings in order to protect the image pickup tubes and their peripheral parts from being influenced by the mutual or external electromagnetic field. Thus, the inner peripheral surface of the primary assembly retaining cylinders 13 is mated with a soft magnetic sheet such as of permalloy (not shown). The cylinder 13 may be of non-magnetic plastic, in which case a separate electrostatic shielding becomes necessary. If the cylinder 13 is made of aluminum instead, then it proves to be quite convenient as it is light weighted, easily and precisably workable, and acts as an electrostatic shielding.

The mount holder 12 formed integrally in itself is attached to a color separation optical system 2 of a multi-tube type color television camera to keep the respective image pickup tube assemblies at predetermined distances from the color separation optical system. The mount holder 12 has a mount surface 12a shaped, for instance, rectangular corresponding to the face of the color separation optical system 2, and has a plurality of through holes 12b parallel to the axis and at positions where the light separated into three colors of R, G and B are received. Through-hole 12b comprises a small diameter section close to the surface 12a and a large diameter section away from the surface 12a. The diameter of the latter section is slightly bigger than the outer diameter of the primary assembly retaining cylinder 13. As will be explained later in further detail, after the relative positions between the primary assembly retaining cylinders and the mount holder are adjusted using the adjusting arrangement (a stand therefor 16 being indicated by a phantom line in FIG. 1), an adhesive 14 is poured into the gap between the large diameter section and the primary assembly retaining cylinders, thereby fixing the two. A shoulder formed at the boundary between the small diameter section and the large diameter section will prevent the image pickup tube assembly from slipping toward the surface 12a.

Figure 2:
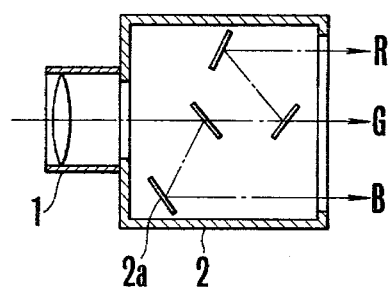
FIG. 2 is a sectional view showing the construction of a color separation optical system on which the integrated pickup component is to be mounted.

FIG. 2 shows how light from the object passing through an objective lens 1 is separated into three colors of R, G and B by the color separation optical system 2 having a plurality of semi-transparent dichroic mirrors 2a formed by metal evaporated film, etc. The use of mirrors facilitates a parallel arrangement of the image pickup tubes as shown in FIG. 2, thereby enabling the use of small sized cameras. A prism separation system with less optical loss may also be used. As is clear from FIG. 2, the length of the smaller diameter section of the through hole 12b associated with the image pickup tube 3G is made longer than that associated with the tubes 3R and 3B because of the difference in the light path between G separating light and R and B separating lights. Accordingly, as shown in FIG. 1, the tube 3G extends beyond the tubes 3R and 3B by the difference in the length.

According to the integrated pickup component of the present invention as explained above, the respective image pickup tube assemblies can be assembled separately before installation into the camera whereas in the prior art it was necessary to insert the yoke assembly into the holder corresponding to the primary assembly retaining cylinder of the present invention coaxially and with a high precision, and then to fix them together with an adhesive, because of a need to individually install the respective image pickup tube assemblies into the camera. This eliminated a need for highly precise alignment of the axes of the yoke assembly 4 and the primary assembly retaining cylinder 13. Further in the prior art, the image pickup tube and the yoke assembly 4 were incorporated into a camera independently of each other, requiring a clamp mechanism for the image pickup tubes at the rear end of the yoke assembly while the camera is in use. Since the present invention uses the adhesive to fix such means at relative positions, there is no longer a need for high precision alignment or a clamp mechanism. The integrated pickup component comprising the primary assembly retaining cylinders 13 into which the image pickup tubes etc. are installed, and the mount holder 12 is fixed to the housing of the color separation optical system 2 by a plurality of lock screws 15 or knock pins (not shown) to complete an image pickup tube unit of the multi-tube type color television camera (tri-tube type in the illustration).

Prior to fixedly attaching this integrated pickup component to the color separation optical system 2, in accordance with the present invention, the image pickup tube device is mounted to the adjusting arrangement to be described later, the relative positions between the primary assembly retaining cylinders 13 and the mount holder 12 are adjusted to adapt the functions of the integrated pickup component being adjusted to the adjusting arrangement color separation optical system having the functions substantially equal to the standard specification (or to the mean value of tolerance, if any) of the color separation optical system in the camera, this latter system acting in combination with the integrated pickup component in the actual camera. Then, the relative positions between the primary assembly retaining cylinders 13 and the mount holder 12 are fixed by the adhesive 14 in a state where the adjustment has been completed. In this manner the present invention eliminates needs for various high precision finishes, sturdy driving means, lock mechanisms, retaining mechanisms, etc., thereby removing restrictions heretofore imposed on the mechanism designing of color television cameras, and offering a compact and light weight multi-tube type color television camera. Since it becomes no longer necessary to conduct complex adjustment within a small space of a camera, the time required for adjustment is radically decreased. Although adjusting registrations of the optical images of the object separated in color by the color separation optical system of the camera and the electron beam scanning area on the target plane of the respective tubes of the integrated pickup component in respect to the center positions and the sizes is still required and indispensable after the integrated pickup component is mounted to the camera, this adjustment is conducted electrically and so is easily completed. Although not shown in the drawing, the mount holder 12 must have holes at suitable places in the side surface thereof, which holes reach the through holes for receiving the primary assembly retaining cylinders 13. Into the narrow gap between the wall of the through hole and the primary assembly retaining cylinder is poured via the additional holes a predetermined amount of the adhesive 14 to secure the relative positions of the mount holder 12 and the primary assembly retaining cylinder 13 in addition to pouring of the adhesive from the entrance of the narrow gap. In order to prevent the external force from being applied to the seal between the face plate of the image pickup tube and the cylinder, and also to prevent the face plate from becoming soiled as it contacts foreign contaminants (such as the oil on the human finger tips), the face plate of the image pickup tube should be positioned slightly inside the through hole 12b rather than flush with the surface 12a to which the optical system is to be attached. Although the mount holder 12 may be a plastic moulded product, it is desirable to use aluminum for the surface to which the optical system is attached and for the wall of the through holes into which the primary assembly retaining cylinders are to be inserted, because highly precise finish is required of the surface 12a and the wall of the through hole which are also desirable to be easy to cool.

Although there has been made a proposal in the prior art to integrally package the image pickup tube and the coil assembly using a resin, the photoconductive film comprised by the target inside the face plate of the image pickup tube may become deteriorated by heating when packaging. Further, it is general to seal the face plate and the image pickup tube envelope using an annular In (indium) gasket which is forcibly inserted therebetween at normal temperature. Since the In gasket is sensitive to temperature rise, there is a danger that the air-tightness of the seal may be destroyed by the temperature rise during packaging. There is a further need to attach a resin pouring device to the adjusting arrangement to be referred to later, complicating the adjusting operation and arrangement. In the case of the present invention, however, the component can be fabricated under the normal temperature and the difficulties as mentioned above can be eliminated, because there are available a variety of high quality adhesives which harden in a comparatively short period of time.

Figure 3:
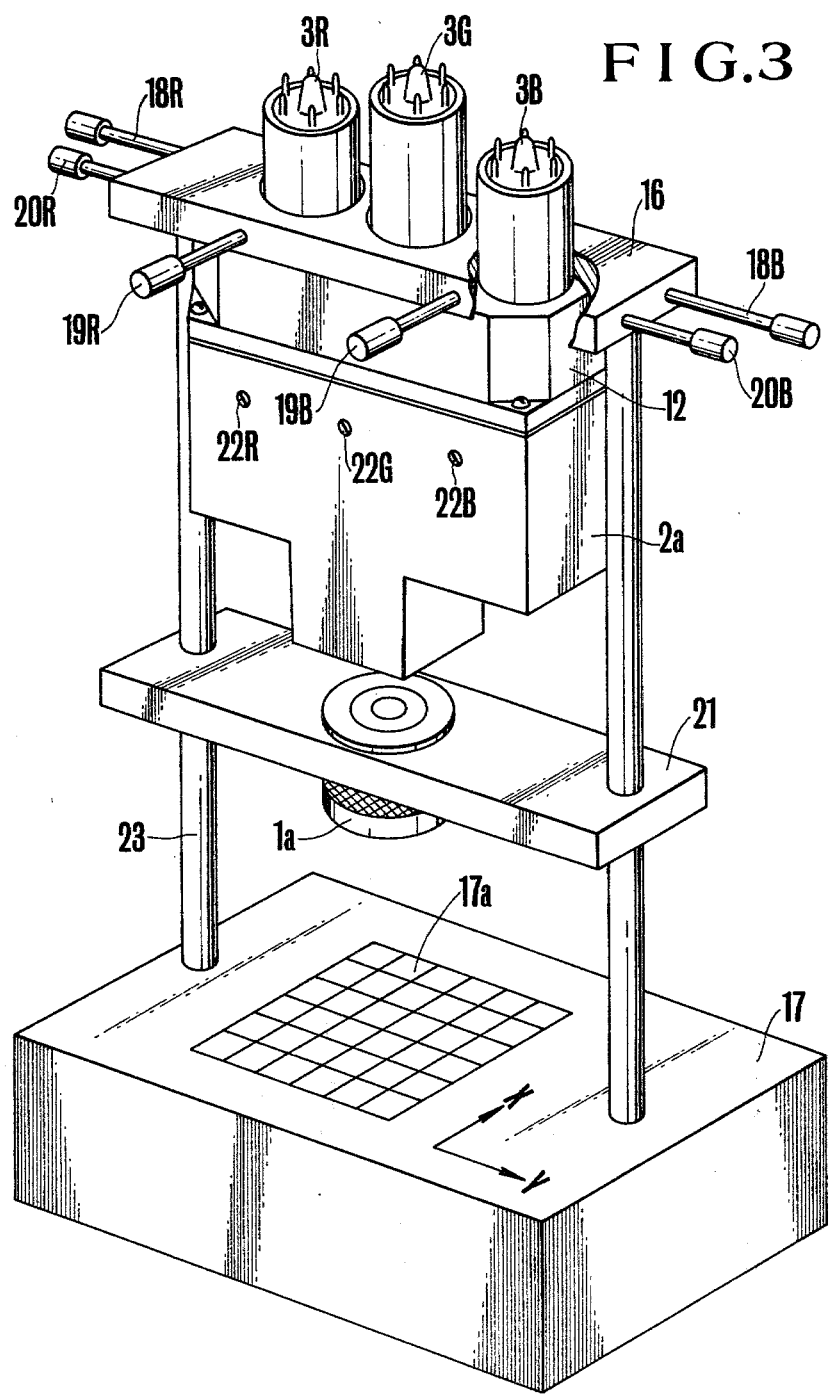
FIG. 3 is a partially exploded perspective view showing one embodiment of the adjusting arrangement in accordance with the present invention.

FIG. 3 shows one embodiment of the adjusting arrangement for the integrated pickup component in accordance with the present invention. In the figure, reference numeral 16 denotes an adjusting stand for mounting thereto the image pickup tube device, 17 a pattern box, 17a a pattern for adjustment, 18B and 18R Y-direction position adjustment screws for the image pickup tubes 3B and 3R accordingly, 19B and 19R X-direction position adjustment screws for the image pickup tubes 3B and 3R respectively, 20B and 20R rotation adjustment screws for the image pickup tubes 3B and 3R respectively, 20B and 20R rotation adjustment screws for the image pickup tubes 3B and 3R respectively, 21 a lens mount, 1a a lens having identical performances to those of the objective lens 1 of the color television camera, and 2a a color separation optical system having identical functions to those of the color separation optical system 2 of the color television camera.

Directions X and Y are selected as shown by arrows on the pattern box 17. Reference numerals 22R, 22G and 22B denote light path adjustment screws for the separated lights R, G and B which are used to conduct individual focus tracking for the image pickup tubes 3R, 3G and 3B. Reference numeral 23 denotes stems to support the adjusting stand 16, the adjusting optical system 1a, 2a and the pattern box 17 at predetermined intervals.

The adjusting arrangement is further provided with visual judging means as shown by FIG. 5. Signals from terminals 50R, 50G and 50B connected to the output terminals of respective image pickup tubes 3R, 3G and 3B are led to a preamplifier 51, and further amplified by a process amplifier 52 to be displayed on the screen of a picture monitor 53. By watching the picture thus displayed, it is determined whether or not the color separated optical images of the adjustment pattern 17a focused by the adjusting optical system on the position where the targent plane of respective image pickup tubes exist are correctly registered with the electron beam acanning area of respective image pickup tubes.

As the rotational positions of the imge pickup tubes 3R and 3B are so determined that the X, Y pattern images for adjusting the image pickup tubes 3B and 3R become registered with the X. Y pattern images of the tube 3G using the latter as the reference, neither X, Y direction adjustment screws nor rotation adjustment screw is provided for the image pickup tube 3G.

Using the adjusting arrangement as constructed above, the mount holder 12 of the integrated pickup component to be adjusted is first connected to the color separation optical system 2a by the lock screws 15, and then the adjusting stand 16 is held in place. The primary assembly retaining cylinders 13 housing the image pickup tubes and their peripheral parts are inserted into the corresponding through holes of the mount holder 12 and engaged with a chucking mechanism provided within the adjusting stand 16. This chucking mechanism can move the primary assembly retaining cylinders 13 housing the image pickup tubes 3B, 3R in the directions of X and Y in respect of the mount holder 12 by the X direction adjustment screws 19B and 19R and Y direction adjustment screws 18B and 18R and/or rotate them around the tube axes by the rotation adjusting screws 20B and 20R. Further reference will be made to the chucking mechanism in relation to FIG. 4.

The light source housed within the pattern box 17 is turned on to irradiate the adjusting pattern 17a from behind. The adjustment pattern 17a corresponds to the object of the camera, and the optical images of the adjustment pattern 17a separated in color by the color separation optical system of the adjusting arrangement focus on a position where the target plane of respective tubes of the integrated pickup component should be.

When signals from the image pickup tubes are monitored by the picture monitor shown in FIG. 5, there would appear blurry, so-called out of focus images unless the optical images focus on the target plane of the imge pickup tube. In such a case, the tube is moved in the axial direction for focus tracking. Then, the rotational position of the optical images with respect to the electron beam scanning area on the target plane of respective image pickup tubes is adjusted by turning the primary assembly retaining cylinders. The center positions and the sizes of the optical images and the electron beam scanning area are also adjusted by adjusting the deflection coil current. In this case, the image pickup tube 3G for green located in the middle of the three image pickup tubes may be fully adjusted first, and then the tubes 3B and 3R may be adjusted such that the displayed pictures of these tubes 3B and 3R are correctly registered with the displayed picture of the tube 3G by using the adjusting screws 18B and 18R, 19B and 19R, and 20B and 20R and the coil current. After confirming that such an adjustment has been completed, the adhesive is poured into the gap between the mount holder 12 and the primary assembly retaining cylinders 13 from the inlet of the gap and also from the pour holes not shown but described in the foregoing description, thereby fixing the relative positions between the mount holder 12 and the primary assembly retaning cylinders 13 in the state where adjustment had been completed. These works of adjusting and of fixing the relative positions by pouring the adhesive are quite conducted while the integrated pickup component is mounted to the adjusting arrangement since the operations are conducted free of any restrictions in regard of space as within the camera frame. The working time accordingly is radically shortened.

FIG. 4 is a plan view of the exploded portion of FIG. 3 showing in detail an exemplary chucking mechanism. Of similar chucking mechanisms provided for the image pickup tubes 3B and 3R, only one for the image pickup tube 3B is illustrated in FIG. 4. The primary assembly retaining cylinder 13 housing and fixing therein the image pickup tube 3B is inserted in the through hole 12b formed in the mountholder 12. This retaining cylinder 13 is caught by a chuck comprising two arcuate paws 40 coupled together by means of compressed springs 41. By turning the X direction adjustment screw 19B, the retaining cylinder 13 can be moved in the X direction in opposition to the spring 41 to thereby complete the X direction adjustment. When the Y direction adjustment screw 18B is turned, the rotation of this screw is converted into a movement in the Y direction by means of a suitable gear train unit 42. Thus, the retaining cylinder 13 can be moved in the Y direction by turning the screw 18B in opposition to the spring 41, completing the Y direction adjustment. Also, the rotation of the rotation adjustment screw 20B can be converted, by a suitable gear train unit 43, into a motion to rotate the retaining cylinder 13. While being clamped by the chuck, the retaining cylinder 13 is caused to rotate, completing the rotation adjustment.

As described heretofore, the present invention offers compact and light weight multi-tube type, such as tritube type, color television cameras and eliminates the need for complicated adjustment operations by the user. If further alleviates the high precision finish required of some component parts in the prior art, making it possible to extend the applicable fields of the high quality multi-tube color television cameras beyond the use by the professionals at broadcasting stations.

What is claimed is:

1. In a pickup component for mounting thereto a plurality of image pickup tube assemblies arranged in line each having an image pickup tube and its peripheral parts and holding the same at a predetermined position in respect of a color separation optical system for the object within a multi-tube type color television camera, the improvement wherein said pickup component comprises:

a plurality of primary assembly retaining cylinders each housing and fixing thereto the image pickup tube assembly;

a mount holder formed of one piece and connected through its mount surface to the color separation optical system and to which the plurality of primary retaining cylinders are attached to keep predetermined intervals between these cylinders and the color separation optical system, and means for fixing the respective primary assembly retaining cylinders to the mount holder after the relative axial and angular position between the mount holder and the respective retaining cylinders is adjusted, said color separation optical system having adjustment screws for fine axial adjustment.

2. A pickup component according to claim 1 wherein said mount holder comprises a plurality of through holes, said primary assembly retaining cylinders are inserted in said through holes, respectively, and said primary assembly retaining cylinders are fixed to said mount holder with an adhesive poured into a gap between the wall of the through hole and the retaining cylinder after said adjustment for relative position.

3. A pickup component according to claim 1 wherein said primary assembly retaining cylinder is made of aluminum.

4. An arrangement to adjust the pickup component as recited in claim 1 prior to mounting the pickup component to the color separation optical system for the object within the multi-tube type television camera,
said adjusting arrangement comprising:
- a color separation optical system for adjustment having the identical functions to those of said color separation otpical system of the camera;
- an adjustment stand adapted to support said pickup component in the predetermined position in respect of said adjusting optical system and including means to adjust the relative positions of the primary assembly retaining cylinders of the pickup component being adjusted in respect of the mount holder;
- an adjustment pattern forming an object to be projected on said adjusting optical system;
- means to support the adjusting optical system, the adjustment stand, and the adjustment pattern at predetermined intervals; and
- means to judge and monitor by using the output signal from the respective image pickup tube of the pickup component whether or not the color separated optical images of the adjustment pattern focused by said adjusting optical system on the position where the target of respective image pickup tubes should be located are correctly registered with the electron beam scanning area of the respective image pickup tubes.

5. An adjusting arrangement according to claim 4 wherein said relative position adjusting means comprises a chucking mechanism for clamping the primary assembly retaining cylinder, and the relative position of the primary assembly retaining cylinder is adjusted in respect of coordinate two directions and rotation on a plane.

6. An adjusting arrangement according to claim 4 wherein said judging and monitoring means comprises an amplifier circuit for amplifying said output signal, and a picture monitor for displaying the amplified signal.

* * * * *

UNITED STATES PATENT AND TRADEMARK OFFICE
CERTIFICATE OF CORRECTION

PATENT NO. : 4,264,920

DATED : April 28, 1981

INVENTOR(S) : Hideyuki Sakai and Shinji Otsuka

It is certified that error appears in the above—identified patent and that said Letters Patent is hereby corrected as shown below:

col. 1, line 22:   change "lights" to --light-- col. 6, line 30:   change "accordingly" to --respectively-- col. 6, lines 34-36:   delete "20 B and 20 R rotation adjustment screws for the image pick up tubes 3B and 3R respectively"

col. 6, line 64:   change "imge" to --image-- col. 7, line 33:   change "imge" to --image-- col. 7, line 58:   insert --easily-- after "quite"

col. 8, line 26:   change "If" to --It--

Signed and Sealed this

Sixteenth Day of February 1982

[SEAL]

Attest:

GERALD J. MOSSINGHOFF

Attesting Officer     Commissioner of Patents and Trademarks